Feb. 17, 1970   M. P. REIFMAN ET AL   3,496,393
STEP-BY-STEP ELECTRIC MOTOR WITH DAMPER FOR
SECONDARY ELECTRIC CLOCK
Filed Oct. 28, 1968

United States Patent Office 3,496,393
Patented Feb. 17, 1970

3,496,393
STEP-BY-STEP ELECTRIC MOTOR WITH DAMPER FOR SECONDARY ELECTRIC CLOCK
Mark Petrovich Reifman, prospekt Kosmonavtov 18, korp. 2, kv. 96; Lev Simkhovich Gendelman, Ul. Gertsena 46, kv. 19; and Vladimir Timofeevich Lugovkin, Ul. Razezzhaya 15, kv. 34, all of Leningrad, U.S.S.R.
Filed Oct. 28, 1968, Ser. No. 771,163
Int. Cl. H02k 37/00
U.S. Cl. 310—49    2 Claims

ABSTRACT OF THE DISCLOSURE

An electric rotary stepping motor with toroidal coil and claw tooth stator, and including a permanent magnet rotor having radially stepped trapezoidal pole extension pieces. A combination "no-back" and damper comprises a disk on the rotor shaft and a cooperating spring-loaded eccentric segment on the stator.

---

The present invention relates to step-by-step electric motors for secondary electric clock designed preferably for transporting means.

Known in the art are step-by-step electric motors for secondary electric clock comprising a ring-shaped stator and a rotor with permanent magnet featuring toothed pole extension pieces.

Step-by-step electric motors mentioned above are not dependable in operation in case of vibrations, are of low efficiency, fail to develop large torques and feature noticeable rattling of hands when moving.

It is a primary object of the present invention to eliminate the above mentioned disadvantages.

The invention is aimed at the development of an efficient step-by-step electric motor with high clamping ability, small sizes and greater torque.

Said object is accomplished by the fact that in the step-by-step electric motor with a ring-shaped stator and a rotor with a permanent magnet featuring toothed pole extension pieces, according to the invention the teeth of the pole extension pieces of the rotor provided with damping means capable of presetting the run-out of teeth, are so made that the surface of each tooth which faces the stator is of the stepped shape.

The damping means may be essentially a disk fitted on the rotor shaft which interacts with the spring-loaded segment mounted with a possibility to eccentrically turn on the stator which fact provides for run-out of the teeth of the rotor in the direction of rotation thereof and prevents the teeth from moving in the backward direction.

The step-by-step electric motor implemented according to the present invention made it applicable for secondary clock both for minute and second time reading.

The invention will be hereinbelow described by way of exemplary embodiment of a step-by-step electric motor for secondary electric clock with due reference to the accompanying drawings wherein.

Figure 2:
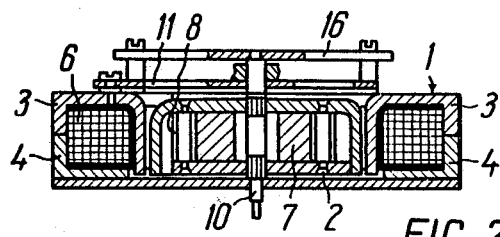
FIG. 2 represents a sectional view of a step-by-step electric motor of FIG. 1.
Figure 1:
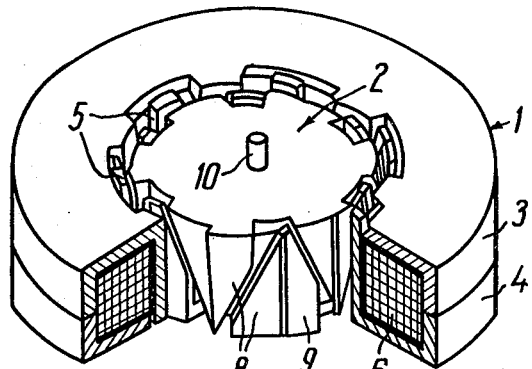
FIG. 1 represents a partial cutaway view of a ring-shaped stator and a rotor of a step-by-step electric motor, according to the invention.

As it is clearly seen from FIGS. 1 and 2, the step-by-step electric motor comprises a ring-shaped stator 1 and a rotor 2.

The stator 1 consists of two annular casings 3 and 4 with square inwardly bent teeth 5 and a ring-shaped winding 6 accommodated within the casings 3 and 4. The rotor 2 incorporates a permanent magnet 7 whereon toothed pole extension pieces 8 are fixed in position above and underneath. The teeth of the pole extension pieces 8 feature trapezoidal shape and are so made that each surface of the tooth facing the stator 1 features a projection which is essentially a step 9. Such shape of the teeth provides for increased surface of interaction of the poles of the rotor and stator with resultant increased torque on the shaft 10. Apart from this, the step 9 provides for an increased clamping moment with the winding 6 of the stator 1 de-energized.

The air gap between the poles of the rotor and stator is made possible by the bore, the number of the poles of the rotor and stator being the same. The step-by-step electric motor in contemplation is provided with damping means capable of presetting the run-out of rotor teeth.

Figure 3:
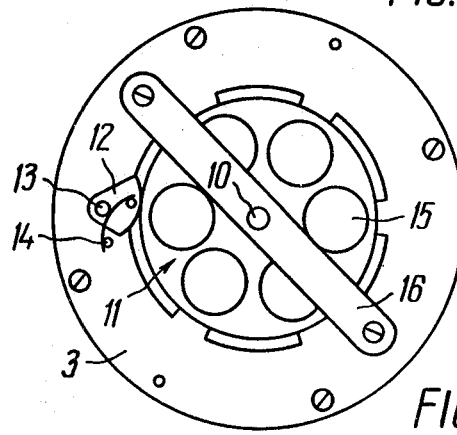
FIG. 3 represents a damping means located on the ring-shaped stator on the rear side thereof.

The above-mentioned damping means is essentially a disk 11 (FIG. 3) fitted on the shaft 10 of the rotor which interacts with the spring-loaded segment 12 eccentrically mounted on the axle 13 with a possibility to turn therethrough, said axle being located on the stator. The segment 12 through a flat spring 14 is pressed against the surface of the disk 11 which is capable of moving together with the rotor in the clockwise direction only, so that the surface of the segment 12 slides over the surface of the disk 11 with slight friction, the rotor by virtue of electrical pulses being moved each time one step and being capable of making a run-out in the direction of rotation which is clamped by the damping means. The rotor is prevented from rotation in the backward direction since in this case the disk 11 is wedged by the segment 12.

With a view of increasing the strength of the segment 12 the latter is made of caprone, whereas to lessen the weight of the disk 11 the holes 15 are made therein. The plate 16 serves as a rest for the shaft 10.

The damping means provides additional increase of the torque on the motor shaft due to the run-out of the rotor teeth and, apart from the abovesaid, it excludes rattling of the hands of the clock motion.

What is claimed is:

1. A step-by-step electric motor for secondary electric clock, comprising: a stator, a ring-shaped rotor with a permanent magnet featuring pole extension pieces; a damping means capable of presetting the run-out of the teeth of said rotor pole extension pieces, said teeth of the rotor pole extension pieces are so made that surface of each tooth which faces the stator is of the stepped shape.

2. A step-by-step electric motor as claimed in claim 1 wherein said damping means is essentially a disk fitted on the rotor shaft, which interacts with a spring-loaded segment mounted eccentrically with a possibility to turn on said stator thereby providing the run-out of the rotor teeth in the direction of rotation of said rotor and preventing the teeth from moving in the backward direction.

References Cited

UNITED STATES PATENTS

| 2,212,192 | 8/1940 | Howell | 310—263 X |
| 3,032,670 | 5/1962 | Fritz | 310—164 |
| 3,119,941 | 1/1964 | Guiot | 310—49 |
| 3,164,734 | 1/1965 | Heinzen | 310—156 |
| 3,197,659 | 7/1965 | Marshall | 310—49 |
| 3,308,314 | 3/1967 | Spring et al. | 310—41 |

WARREN E. RAY, Primary Examiner

U.S. Cl. X.R.
310—41, 156, 162, 257, 263